(12) United States Patent
Lo

(10) Patent No.: US 11,190,754 B2
(45) Date of Patent: Nov. 30, 2021

(54) 3D DISPLAY DEVICE HAVING A PROCESSOR FOR CORRECTING PSEUDOSTEREOSCOPIC EFFECT

(71) Applicant: 3D Media Ltd., Chai Wan (HK)

(72) Inventor: Kwok Wah Allen Lo, Causeway Bay (HK)

(73) Assignee: 3D MEDIA LTD., Chai Wan (HK)

( * ) Notice: Subject to any disclaimer, the term of this patent is extended or adjusted under 35 U.S.C. 154(b) by 0 days.

(21) Appl. No.: 16/748,947

(22) Filed: Jan. 22, 2020

(65) Prior Publication Data

US 2021/0227197 A1    Jul. 22, 2021

(51) Int. Cl.
| | |
|---|---|
| *H04N 13/305* | (2018.01) |
| *H04N 13/31* | (2018.01) |
| *G02B 30/30* | (2020.01) |
| *G02B 30/27* | (2020.01) |
| *G06F 3/01* | (2006.01) |
| *H04N 13/383* | (2018.01) |
| *H04N 13/366* | (2018.01) |

(52) U.S. Cl.
CPC ........... *H04N 13/305* (2018.05); *G02B 30/27* (2020.01); *G02B 30/30* (2020.01); *G06F 3/013* (2013.01); *H04N 13/31* (2018.05)

(58) Field of Classification Search
CPC ................. H04N 13/305; H04N 13/31; H04N 13/366–383; H04N 13/349; G02B 30/30; G02B 30/27; G06F 3/013
USPC .......................................................... 348/59
See application file for complete search history.

(56) References Cited

U.S. PATENT DOCUMENTS

| | | | | |
|---|---|---|---|---|
| 2011/0032346 | A1* | 2/2011 | Kleinberger | H04N 13/317 348/59 |
| 2012/0044330 | A1* | 2/2012 | Watanabe | G02B 30/26 348/54 |
| 2013/0176303 | A1* | 7/2013 | Ek | H04N 13/302 345/419 |
| 2014/0139644 | A1* | 5/2014 | Ueda | G02B 7/34 348/49 |
| 2014/0320614 | A1* | 10/2014 | Gaudreau | G02B 30/27 348/51 |
| 2015/0145977 | A1* | 5/2015 | Hoffman | H04N 13/371 348/59 |
| 2015/0234196 | A1* | 8/2015 | Ohbitsu | H04N 13/305 359/463 |
| 2017/0078643 | A1* | 3/2017 | Lo | H04N 13/351 |

\* cited by examiner

*Primary Examiner* — Christopher S Kelley
*Assistant Examiner* — Kathleen M Walsh
(74) *Attorney, Agent, or Firm* — Ware, Fressola, Maguire & Barber LLP

(57) ABSTRACT

A display device has a display panel for displaying a composite image to allow a viewer to see a 3D image. The composite image has a plurality of right and left image strips alternately arranged. The display device also has camera to monitor a viewing position of a viewer. The camera has a camera lens and a sensor with a plurality of right sensor zones and left sensor zones to capture the viewer's right eye and left eye images. When the viewer is at a viewing position that the 3D image viewed by the viewer appears pseudostereoscopic, the viewer's right eye image is in one of the left sensor zones and left eye image is in one of the right sensor zones. A processor changes the order of the right and left image strips so that the viewer can see a orthostereoscopic image at that viewing position.

14 Claims, 6 Drawing Sheets

3D DISPLAY DEVICE HAVING A PROCESSOR FOR CORRECTING PSEUDOSTEREOSCOPIC EFFECT

FIELD OF THE INVENTION

The present invention relates generally to a display device having a 3D display panel and, more particularly, to a method and processor for correcting the pseudostereoscopic effect on the 3D display panel.

BACKGROUND OF THE INVENTION

In an electronic display device, such as a mobile phone, a tablet, a monitor, a television set or the like that has a 3D display panel associated with a parallax sheet, it is desirable to have a 3D image viewed correctly.

SUMMARY OF THE INVENTION

The present invention is directed to the viewing of a composite image through a parallax sheet to realize a 3D image on a 3D display panel. A camera is used to monitor the position of a viewer in relationship to a 3D display panel. Based on the image of the viewer's eyes in the camera sensor, an image processor is used to rearrange the composite image so that the 3D image seen on the 3D display by the viewer on the 3D display panel is always ortho-stereoscopic, and not pseudostereoscopic. Thus, it is the first aspect of the present invention to provide an electronic device, comprising:
  a display device arranged to display a stereoscopic image of a scene to be viewed by a viewer positioned in front of the display device;
  an image processor arranged to compose a composite image from a left image and a right image of the scene; and
  a camera positioned in relationship to the display device, wherein the display device comprises:
    a display panel arranged to display the composite image, the composite image having a plurality of image segments including L segments and R segments alternately arranged, wherein the L segments are indicative of the left image and the R segments are indicative of the right image; and
    a parallax sheet disposed on the display panel, the parallax sheet having a plurality of parallax elements, each parallax element dimensioned to cover one segment pair comprising one L segment and one adjacent R segment in an arrangement order; wherein
  the camera comprises an image sensor arranged to capture at least a part of a facial image of the viewer, including an image of the left eye and an image of the right eye of the viewer, the image sensor comprising a plurality of L sensor zones and a plurality of R sensor zones alternatively arranged such that when the image of the right eye is formed in one of the R sensor zones and the image of the left eye is formed in one of the L sensor zones, the L segments and the R segments of the composite image are arranged to be viewed, respectively, by the left eye and the right eye of the viewer, and wherein when the image of the right eye is formed in one of the L sensor zones and the image of the left eye is formed in one of the R sensor zones, the image processor is arranged to adjust the composite image such that the arrangement order of the one L segment and the one adjacent R segment in said one segment pair is effectively reversed.

According to an embodiment of the present invention, the parallax sheet comprises a lenticular screen and the plurality of parallax elements comprise a plurality of lenticules.

According to an embodiment of the present invention, the parallax sheet comprises a parallax barrier and the plurality of parallax elements comprise a plurality of clear and opaque segment pairs.

According to an embodiment of the present invention, the display panel comprises a liquid-crystal display panel.

According to an embodiment of the present invention, the display panel comprises an OLED display panel.

According to an embodiment of the present invention, the electronic device is a mobile phone.

According to an embodiment of the present invention, each of the image segments of the composite image has a longitudinal axis and a segment width, and each of the parallax elements is substantially parallel to the longitudinal axis, each of the parallax elements having an element width substantially equal to two times the segment width, and wherein when the image of the right eye is formed in one of the L sensor zones and the image of the left eye is formed in one of the R sensor zones, the image processor is arranged to shift the composite image in a direction perpendicular to the longitudinal direction of the image segments by a distance substantially equal to the segment width so that the arrangement order of the one L segment and the one adjacent R segment in said one segment pair is effectively reversed.

The second aspect of the present invention is a method for use in an electronic device, the electronic device comprising:
  a display device arranged to display a stereoscopic image of a scene to be viewed by a viewer positioned in front of the display device, and
  an image processor arranged to compose a composite image from a left image and a right image of the scene, the display device comprising:
    a display panel arranged to display the composite image, the composite image having a plurality of image segments including L segments and R segments alternately arranged, wherein the L segments are indicative of the left image and the R segments are indicative of the right image; and
    a parallax sheet disposed on the display panel, the parallax sheet having a plurality of parallax elements, each parallax element dimensioned to cover one segment pair comprising one L segment and one adjacent R segment in an arrangement order, said method comprising:
  providing a camera on the electronic device in relationship to the display device, the camera comprising an image sensor arranged to capture at least a part of a facial image of the viewer, including an image of the left eye and an image of the right eye of the viewer;
  partitioning the image sensor into a plurality of L sensor zones and a plurality of R sensor zones alternatively arranged, such that when the image of the right eye is formed in one of the R sensor zones and the image of the left eye is formed in one of the L sensor zones, the L segments and the R segments of the composite image are arranged to be viewed, respectively, by the left eye and the right eye of the viewer; and
  adjusting the composite image so that the arrangement order of the one L segment and the one R segment in said one adjacent segment pair is effectively reversed, when the image of the right eye is formed in one of the L sensor zones and the image of the left eye is formed in one of the R sensor zones.

According to an embodiment of the present invention, the parallax sheet comprises a lenticular screen and the plurality of parallax elements comprise a plurality of lenticules or a parallax barrier and the plurality of parallax elements comprise a plurality of clear and opaque segment pairs.

According to an embodiment of the present invention, each of the image segments of the composite image has a longitudinal axis and a segment width, and each of the parallax elements is substantially parallel to the longitudinal axis, each of the parallax elements having an element width substantially equal to two times the segment width, and wherein when the image of the right eye is formed in one of the L sensor zones and the image of the left eye is formed in one of the R sensor zones, the image processor is arranged to shift the composite image in a direction perpendicular to the longitudinal direction of the image segments by a distance substantially equal to the segment width so that the arrangement order of the one L segment and the one adjacent R segment in said one segment pair is effectively reversed.

The present invention will become apparent upon reading the description taken in conjunction with FIGS. 1 to 10.

DETAILED DESCRIPTION OF THE INVENTION

Figure 1:
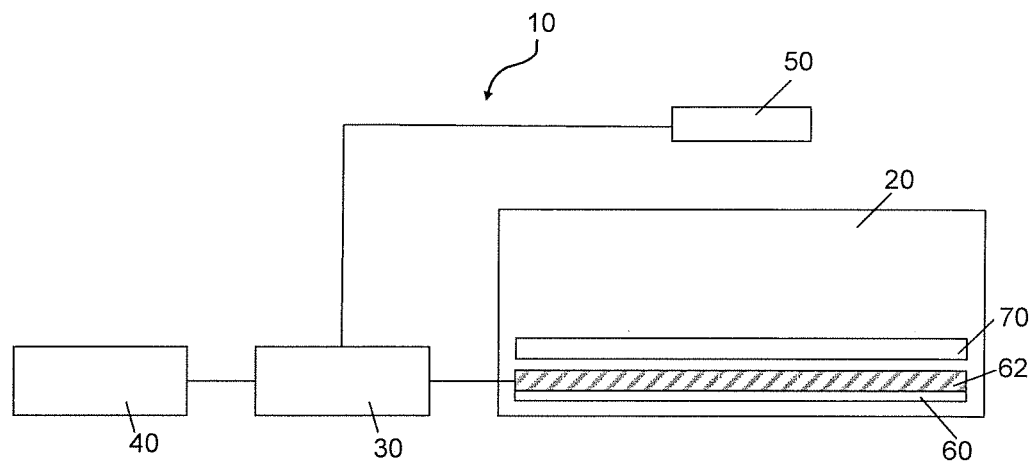
FIG. 1 is a block diagram of a display device having a display area with a 3D display panel, according to an embodiment of the present invention.

The present invention is directed to a method and an apparatus for producing a 3D image to be displayed on a display device, such as a mobile phone, a tablet, a computer monitor or a television set. The display device has a display area and an electronic or image processor to produce an image to be shown in 3D. It is known that a 3D image is composed of at least a left image and a right image of a stereoscopic image pair. As shown in FIG. 1, the display device 10 has a display area 20 with a display panel 60 to display the 3D image. The display panel 60 can be a liquid-crystal display panel, an OLED display panel or the like. The display device 10 has an image data source 40 to store image data having stereo-image pairs and an image processor 30 to produce a composite image 62 from the image pairs. The image processor 30 is arranged to provide signals indicative of the composite image 62 to the display panel 60 in the display area 20. The composite image 62 has a plurality of image strips or segments including L (left) and R (right) image segments alternatively arranged. A parallax sheet 70 is securely placed, attached or formed over the display panel 60 for angular separation so that the left and right eyes of a viewer can see the L (left image segments) and the R (right image segments) in the composite image 62, respectively (see FIG. 3A, for example).

Figure 2:
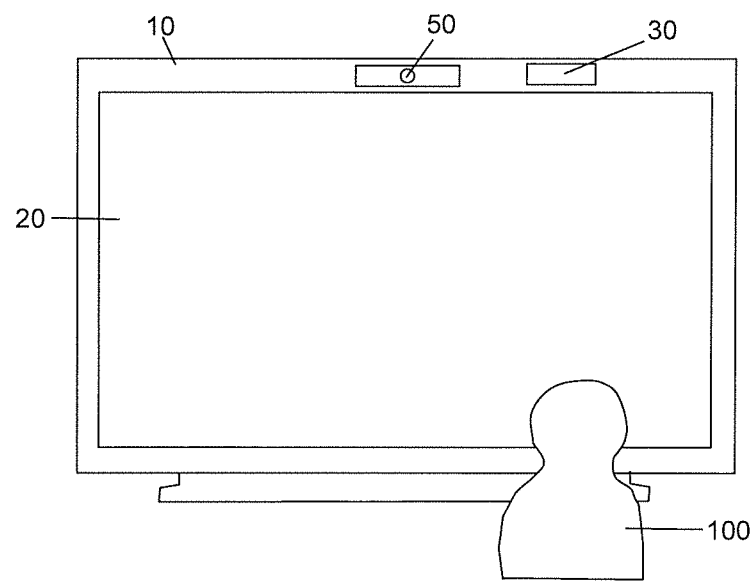
FIG. 2 is a schematic representation of the display device, according to an embodiment of the present invention.

According to an embodiment of the present invention, the display device 10 also has a camera 50 positioned in relationship to the display area 20 to detect the viewer's position and to provide information indicative to the viewer's position to the image processor 30. A schematic representation of the display device 10 is shown in FIG. 2. As shown in FIG. 2, a viewer 100 is typically positioned in front of the display device 10 to view the 3D image on the display area 20. The camera 50 is positioned in relationship to the display area 20 to monitor the position of the viewer 100.

Figure 3A:
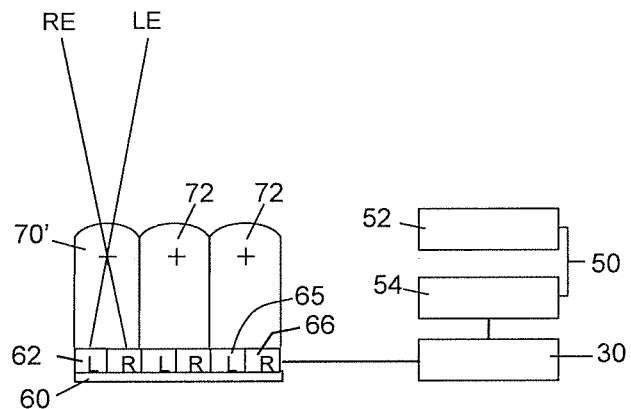
FIG. 3A shows a lenticular screen associated with the display panel in an image display area, according to an embodiment of the present invention.

According to an embodiment of the present invention, a lenticular screen 70' is used as a parallax sheet 70 securely attached on the top of the display panel 60. The lenticular screen 70' has a plurality of lenticules 72. The width of the lenticules 72 is approximately equal to the width of a pair of L segment 65 and R segment 66. As shown in FIG. 3A, the lenticules 72 are arranged such that the LE (left eye) and the RE (right eye) of the viewer would see the L segments 65 and the R segments 66. At the same time, the camera lens 52 of the camera 50 is arranged to form the images of the viewer's eyes LE and RE on the camera sensor 54. The camera sensor 54 is arranged to provide information indicative of the location of the LE, RE images of to the image processor 30 for composing the composite image 62 of the display panel 60.

Figure 3B:
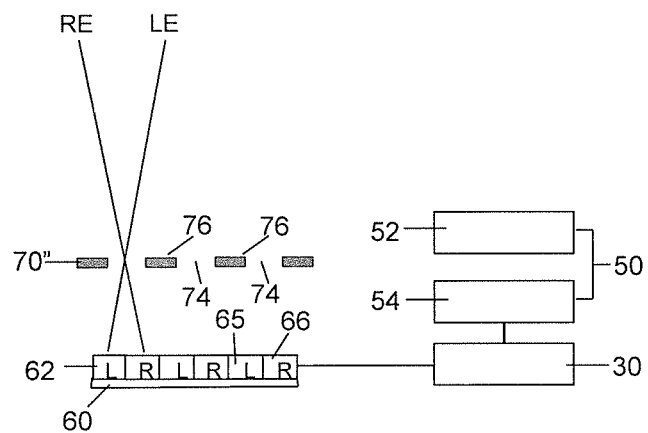
FIG. 3B shows a parallax barrier associated with the display panel in the image display area, according to an embodiment of the present invention.

According to an embodiment of the present invention, a parallax barrier 70" is used as the parallax sheet 70. As shown in FIG. 3B, a parallax barrier 70" has a plurality of clear areas 74 and a plurality of opaque areas 76 alternately arranged. A pair of clear area 74 and opaque area 76 is equivalent to a lenticule 72 of the lenticular screen 70' as shown in FIG. 3A.

Figure 4:
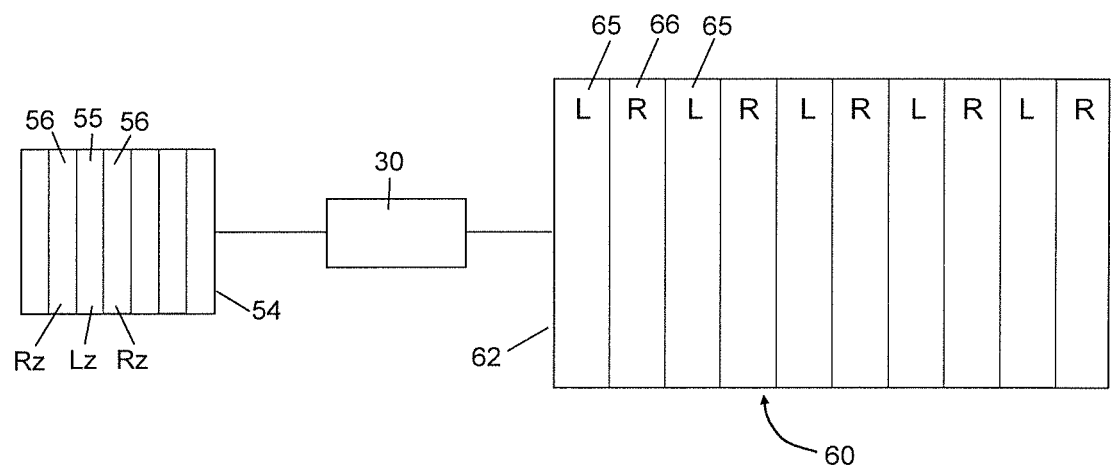
FIG. 4 shows the electronic link between the camera sensor and the composite image.

FIG. 4 shows a section of camera sensor 54 and the image processor 30 linked to the display panel 60 to form a composite image 62 with L segments 65 and R segments 67 alternately arranged. According to an embodiment of the present invention, the order of the L, R segments in the composite image 62 in relationship with the parallax sheet can be rearranged or reversed depending on the position of a viewer. As shown in FIG. 4, the camera sensor 54 is divided into a plurality of Lz sensor zones 55 and a plurality of Rz sensor zones 56 alternately arranged.

Figure 5A:
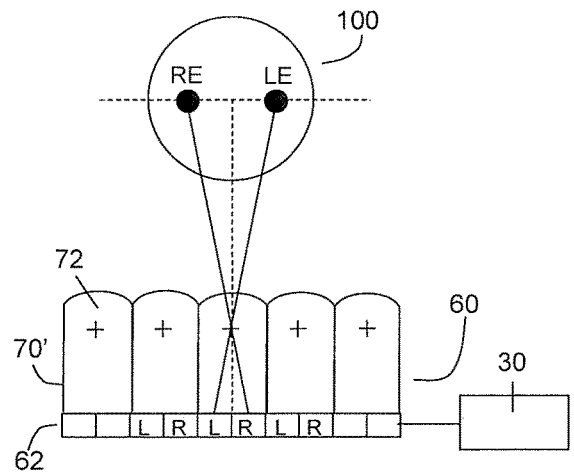
FIG. 5A shows a viewer viewing a section of the display panel wherein the viewed 3D image is ortho-stereoscopic.
Figure 5B:
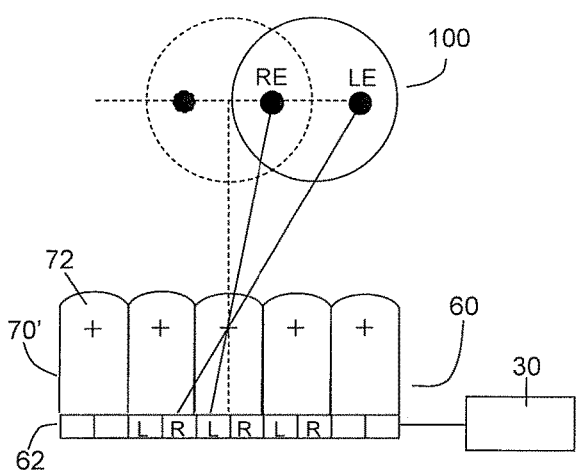
FIG. 5B shows a viewer viewing a section of the display panel wherein the viewed 3D image is pseudostereoscopic.
Figure 6A:
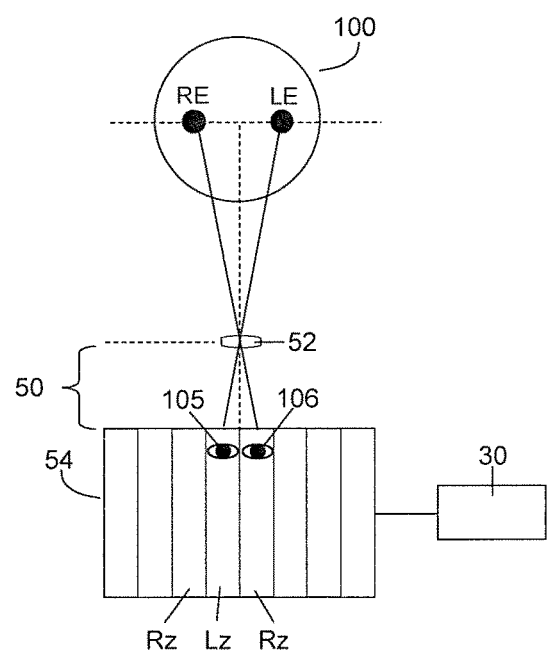
FIG. 6A illustrates a camera having a camera sensor to detect the viewer's position as shown in FIG. 5A.
Figure 6B:
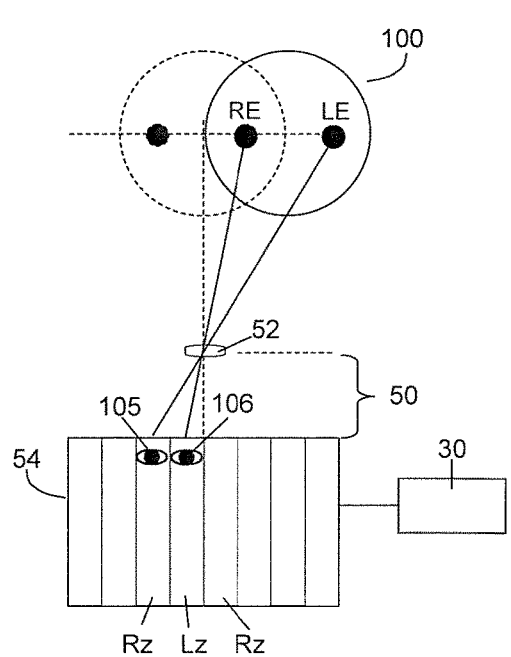
FIG. 6B illustrates the camera sensor detecting the viewer's position as shown in FIG. 5B.
Figure 8:
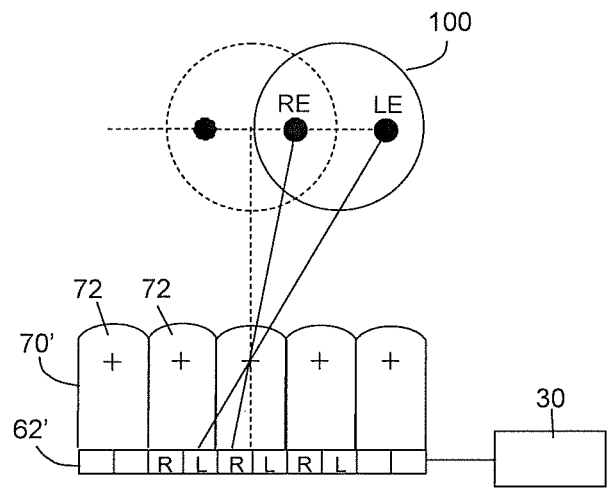
FIG. 8 shows a viewer viewing a section of the display panel as shown in FIG. 5B wherein the viewed 3D image is orthoscopic after the composite image is corrected.

FIGS. 5A and 5B illustrate a viewer 100 positioned in relationship to the display panel 60 to view a composite image 62 through a lenticular screen 70'. FIGS. 6A and 6B show the image of the left eye 105 and the image of the right eye 106 formed in the camera sensor 54. In FIG. 5A, the viewer 100 is positioned such that the viewer's left eye (LE) sees the L segments in the composite image 62 and the viewer's right eye (RE) sees the R segments of the composite image 62. L segments and R segments are produced from the left image and the right image of a stereo-image pair, respectively. Thus, the 3D image viewed by the viewer 100 is ortho-stereoscopic. In FIG. 5B, the viewer 100 is positioned such that the viewer's left eye (LE) sees the R segments in the composite image 62 and the viewer's right eye (RE) sees the L segments of the composite image 62. Thus, the 3D image viewed by the viewer 100 is pseudostereoscopic. According to an embodiment of the present invention, the pseudostereoscopic effect can be corrected as shown in FIG. 8 below.

Figure 7A:
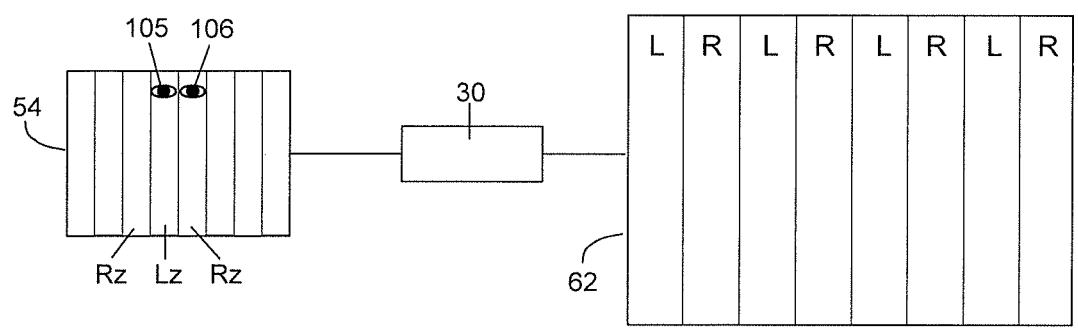
FIG. 7A illustrates the relationship between the eye images in the image sensor zones and the image segments in the composite image when the eye images are in the correct sensor zones.
Figure 7B:
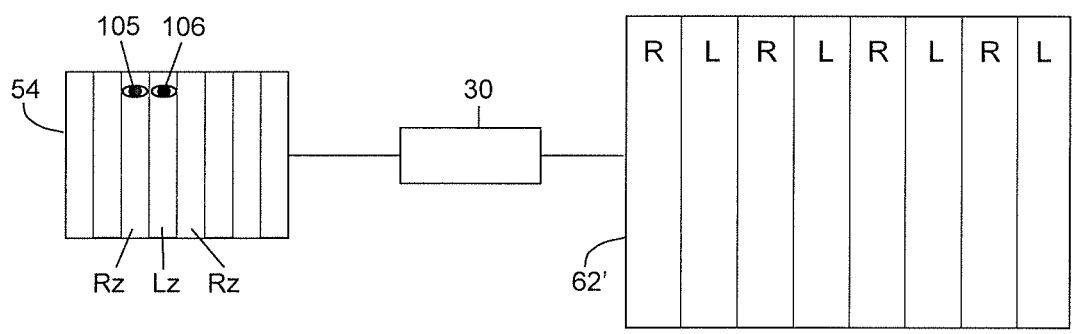
FIG. 7B illustrates the relationship between the eye images in the image sensor zones and the image segments in the composite image when the eye images are in the incorrect sensor zones but the image strips on the composite image have been rearranged.

As described above in conjunction with FIG. 4, the sensor 54 is divided into a plurality of Lz zones 55 and a plurality of Rz zones 56 alternately arranged. When the viewer 100 is positioned such that LE sees the L segments 65 and RE sees the R segments 66 through the lenticular sheet 70' (or parallax barrier 70") as shown in FIG. 5A, and the 3D image viewed by the viewer 100 is a stereoscopic 3D image, the camera lens 52 of the camera 50 is arranged such that the image of LE of the viewer 100 is formed in one of the Lz zones 55 and the image of RE of the viewer 100 is formed in one of the adjacent Rz zones 65. In that case, the image processor 30 is arranged to keep the order of the L, R segments in the composite image 62 unchanged, as shown in FIG. 7A. But when the viewer 100 is positioned such that RE sees the L segments 65 and LE sees the R segments 66 through the lenticular sheet 70' as shown in FIG. 5B, and the 3D image viewed by the viewer 100 is a pseudostereoscopic 3D image, the camera lens 52 of the camera 50 is arranged such that the image of RE of the viewer 100 is formed in one of the Lz zones 55 and the image of LE of the viewer 100 is formed in one of the adjacent Rz zones 65. In that case, the image processor 30 is configured to rearrange the order of the L, R segments in the composite image 62' as shown in FIG. 7B.

After the order of the L, R segments in the composite image 62' has been changed, the viewer positioned as illustrated in FIG. 5B can also see a normal stereoscopic 3D image. As shown in FIG. 8, the order of R segments and the L segments on the composite image 62' has been changed. In an embodiment of the present invention, the positions of the R and L segments under the same lenticule 72 are reversed.

Figure 9:
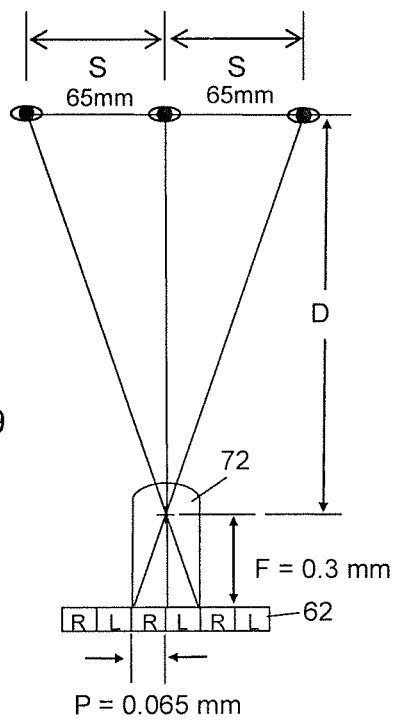
FIG. 9 shows the width of image strips in the composite image in relationship to the optical characteristic of the lenticules on the lenticular sheet.

FIG. 9 shows the width of image strips in the composite image in relationship to the optical characteristic of the lenticules in the lenticular sheet, according to an embodiment of the present invention. As shown in FIG. 9, the width P of the image strips L, R is substantially equal to one half the width of the lenticules 72. If the focal distance of the lenticules in F, the distance between the left eye and the right eye is S and the viewing distance is D, we have $P/S=F/D$, or $P/F=S/D$.

Figure 10:
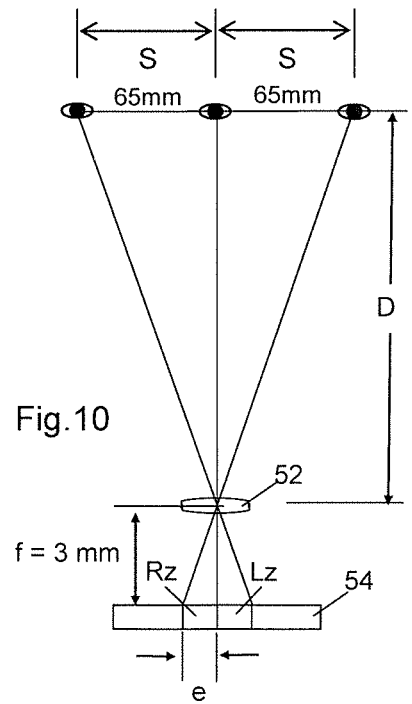
FIG. 10 shows the width of the sensor zones in the image sensor in relationship to the optical characteristic of the camera lens.

FIG. 10 shows the width of the sensor zones in the image sensor in relationship to the optical characteristic of the camera lens. As shown in FIG. 10, the width e of the sensor zones Lz, Rz is equal to $f*(S/D)$, or $e/f=S/D$, with f being the focal length of the camera lens 52. When compared with $P/F=S/D$, we have $e/f=P/F$. With the focal length f of the camera lens 52 being 3 mm and the focal distance F of the lenticules being 0.3 mm, we have $e=P*f/F$ or $P*10$.

If the lenticular screen 72 is selected such that P=0.065 mm, the width e of the sensor zones is 0.65 mm. It should be noted that the width P of the image segments 65, 66 cannot be smaller than the dimension of the pixels of the display panel 60, but it can be n times the width of the pixels, with n being an integer greater than 1. Generally, the pixel width of the image sensor 54 is very small. For example, the pixel width of the image sensor 54 can be 0.001625 mm. In that case, each sensor zone Lz or Rz can have 400 sensor pixel rows.

In summary, the present invention uses a camera to monitor the position of a viewer is relationship to a 3D display panel. The camera has a camera lens to form the eyes of the viewer in a camera sensor. The camera sensor is divided into a plurality of sensor zones related to the image strips in the composite image shown in the 3D display panel. Based on the location of the images of the left eye and the right eye of viewer in the sensor zones, the left and right image strips in the composite image is rearranged so that the 3D image seen on the 3D display panel by the viewer always a stereoscopic 3D image. The 3D display panel can be a liquid-crystal display panel, an OLED display panel or the like, and the parallax sheet used on the 3D display panel can be a lenticular sheet or a parallax barrier.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. An electronic device, comprising:
    a display device arranged to display a stereoscopic image of a scene to be viewed by a viewer positioned in front of the display device;
    an image processor arranged to compose a composite image from a left image and a right image of the scene; and
    a camera positioned in relationship to the display device, wherein the display device comprises:
        a display panel arranged to display the composite image, the composite image having a plurality of image segments including L segments and R segments alternately arranged, wherein the L segments are indicative of the left image and the R segments are indicative of the right image; and
        a parallax sheet disposed on the display panel, the parallax sheet having a plurality of parallax elements, each parallax element dimensioned to cover one segment pair comprising one L segment and one adjacent R segment in an arrangement order; wherein
    the camera comprises an image sensor arranged to capture at least a part of a facial image of the viewer, including an image of the left eye and an image of the right eye of the viewer, the image sensor comprising a plurality of L sensor zones and a plurality of R sensor zones alternatively arranged such that when the image of the right eye is formed only in one of the R sensor zones and the image of the left eye is formed only in one of the L sensor zones, the L segments and the R segments of the composite image are arranged to be viewed, respectively, by the left eye and the right eye of the viewer, and wherein when the image of the right eye is formed only in one of the L sensor zones and the image of the left eye is formed only in one of the R sensor zones, the image processor is arranged to adjust the composite image such that the arrangement order of the one L segment and the one adjacent R segment in said one segment pair is effectively reversed.

2. The electronic device according to claim 1, wherein the parallax sheet comprises a lenticular screen and the plurality of parallax elements comprise a plurality of lenticules.

3. The electronic device according to claim 1, wherein the parallax sheet comprises a parallax barrier and the plurality of parallax elements comprise a plurality of clear and opaque segment pairs.

4. The electronic device according to claim 1, wherein the display panel comprises a liquid crystal display panel.

5. The electronic device according to claim 1, wherein the display panel comprises an OLED display panel.

6. A mobile phone comprising the electronic device according to claim 1.

7. The electronic device according to claim 1, wherein each of the image segments of the composite image has a longitudinal axis and a segment width, and each of the parallax elements is substantially parallel to the longitudinal axis, each of the parallax elements having an element width substantially equal to two times the segment width, and wherein when the image of the right eye is formed in one of the L sensor zones and the image of the left eye is formed in one of the R sensor zones, the image processor is arranged to shift the composite image in a direction perpendicular to the longitudinal direction of the image segments by a distance substantially equal to the segment width so that the arrangement order of the one L segment and the one adjacent R segment in said one segment pair is effectively reversed.

8. A method for use in an electronic device, the electronic device comprising:
   a display device arranged to display a stereoscopic image of a scene to be viewed by a viewer positioned in front of the display device, and
   an image processor arranged to compose a composite image from a left image and a right image of the scene, the display device comprising:
     a display panel arranged to display the composite image, the composite image having a plurality of image segments including L segments and R segments alternately arranged, wherein the L segments are indicative of the left image and the R segments are indicative of the right image; and
     a parallax sheet disposed on the display panel, the parallax sheet having a plurality of parallax elements, each parallax element dimensioned to cover one segment pair comprising one L segment and one adjacent R segment in an arrangement order, said method comprising:
   providing a camera on the electronic device in relationship to the display device, the camera comprising an image sensor arranged to capture at least a part of a facial image of the viewer, including an image of the left eye and an image of the right eye of the viewer;
   partitioning the image sensor into a plurality of L sensor zones and a plurality of R sensor zones alternatively arranged, such that when the image of the right eye is formed only in one of the R sensor zones and the image of the left eye is formed only in one of the L sensor zones, the L segments and the R segments of the composite image are arranged to be viewed, respectively, by the left eye and the right eye of the viewer; and
   adjusting the composite image so that the arrangement order of the one L segment and the one R segment in said one adjacent segment pair is effectively reversed, when the image of the right eye is formed only in one of the L sensor zones and the image of the left eye is formed only in one of the R sensor zones.

9. The method according to claim 8, wherein the parallax sheet comprises a lenticular screen and the plurality of parallax elements comprise a plurality of lenticules.

10. The method according to claim 8, wherein the parallax sheet comprises a parallax barrier and the plurality of parallax elements comprise a plurality of clear and opaque segment pairs.

11. The method according to claim 8, wherein the display panel comprises a liquid-crystal display panel.

12. The method according to claim 8, wherein the display panel comprises an OLED display panel.

13. The method according to claim 8, wherein the electronic device comprises a mobile phone.

14. The method according to claim 8, wherein each of the image segments of the composite image has a longitudinal axis and a segment width, and each of the parallax elements is substantially parallel to the longitudinal axis, each of the parallax elements having an element width substantially equal to two times the segment width, and wherein when the image of the right eye is formed in one of the L sensor zones and the image of the left eye is formed in one of the R sensor zones, the image processor is arranged to shift the composite image in a direction perpendicular to the longitudinal direction of the image segments by a distance substantially equal to the segment width so that the arrangement order of the one L segment and the one adjacent R segment in said one segment pair is effectively reversed.

* * * * *